US006588379B2

(12) United States Patent
Bingham et al.

(10) Patent No.: US 6,588,379 B2
(45) Date of Patent: Jul. 8, 2003

(54) MULTI-STREAM ENERGY SOURCE STEAM GENERATOR SYSTEM

(75) Inventors: Billy E. Bingham, Lynchburg, VA (US); Stephen W. Scoles, Lynchburg, VA (US); Ronald C. Watson, Forest, VA (US)

(73) Assignee: BWX Technologies, Inc., Lynchburg, VA (US)

( * ) Notice: Subject to any disclaimer, the term of this patent is extended or adjusted under 35 U.S.C. 154(b) by 0 days.

(21) Appl. No.: 09/922,667

(22) Filed: Aug. 6, 2001

(65) Prior Publication Data

US 2003/0024488 A1 Feb. 6, 2003

(51) Int. Cl.[7] .................................................. F16T 1/00
(52) U.S. Cl. ........................... 122/235.16; 122/235.23; 122/479.2; 122/489; 122/492
(58) Field of Search .......................... 122/30, 34, 31.1, 122/235.21, 235.16, 235.23, 414, 448.3, 459, 479.2, 488, 492, 491, 415, 489

(56) References Cited

U.S. PATENT DOCUMENTS

| | | | | |
|---|---|---|---|---|
| 1,927,649 A | * | 9/1933 | Noack | ........................ 122/31.1 |
| 3,682,140 A | * | 8/1972 | Roffler | ........................ 122/34 |
| 4,393,815 A | * | 7/1983 | Pedersen et al. | ........... 122/31.1 |
| 4,437,316 A | | 3/1984 | Dyer et al. | |
| 4,697,550 A | * | 10/1987 | Kehrer | ........................ 122/34 |

* cited by examiner

Primary Examiner—Gregory Wilson
(74) Attorney, Agent, or Firm—Robert C. Baraona

(57) ABSTRACT

A steam generator system incorporates multiple processes, either in series or independently and with each process having a process fluid associated therewith, to transfer heat between a common working fluid and the process fluids in order to generate steam from the working fluid. The heat transfer may be controlled by controlling the flow of the working fluid to further regulate and control the generation of steam and/or the individual processes themselves. The generator system includes a vessel and may optionally have baffles located within the vessel to separate the flow of working fluid into a recirculation system to facilitate in the overall operation of the system. The working fluid must be capable of forming steam and preferably consists essentially of water. Straight tubes, plate-type heat exchange surfaces having a common boiling fluid stream, U-tubes, helical tubes, and/or curved tubes may be used as heat exchange means for transferring heat between the working fluid and the process fluids.

33 Claims, 3 Drawing Sheets

MULTI-STREAM ENERGY SOURCE STEAM GENERATOR SYSTEM

The present invention was conceived under government contract NSWC: N000167-98-C-0056. The United States' government may retain certain rights to this invention.

FIELD OF THE INVENTION

The invention itself relates generally to steam generators and more particularly to such steam generators using a plurality of energy sources to generate the steam therefrom.

DESCRIPTION OF THE PRIOR ART

The steam generators designed to date have used a single fluid stream from a process as the energy source for the steam generation. In the case of multiple energy sources, separate steam generators, either in parallel or series, have been used to generate the steam. Such use of separate steam generators result in more individual components and complicated controls, which are consequently more complex and have more opportunities for flow induced instabilities.

In many process systems, multiple fluid streams are often used. These streams contain excessive energy which may be recovered. An attractive way to accomplish this recovery is to generate steam for use in the process system or for other independent uses (i.e., power generation, space heating, etc.).

For example, in the pulp and paper industry, huge equipment installations necessitate the use of extremely large amounts of energy. Thus, multiple fluid streams are required to produce tons of pulp and paper on a daily basis. Equipment of this nature must also be capable of operating continuously with very little down time.

Another example involves systems such as thermo-mechanical pulping (TMP) and chemi-mechanical pulping (CMP), both of which require extremely large quantities of electrical energy to operate motors (typically these motors have power ratings in the thousands of horsepower range). These TMP/CMP motors grind wood chips to a fine pulp at an output rate of more than 100 tons per day. As a result, extremely large quantities of waste energy are generated during the conversion of the electrical power to drive the motors. Subsequently, this mechanical energy is converted to thermal energy in the form of steam. This steam is then passed through a tube containing the wood chips, prior to their entry into a primary refiner, to soften the chips and to facilitate in the refining operation. However, the heat generated during the actual refining operation, which is performed in a confined region, is vented to the atmosphere through an exhaust conduit. Although some efforts have been developed to recycle small portions of the vented exhaust to the aforementioned steaming tube in which the chips are initially heated and softened, the vast majority of the heat energy is still unrecoverable and hence is lost.

Yet another example involves the processing of hydrocarbon-based fuels into a hydrogen rich gas for industrial uses, and particularly for use in fuel cells. In this example, steam is produced using the energy from multiple process streams (i.e., hot exhaust gas from the fuel cell stack). The invention disclosed below was originally developed for this particular application, although it is expected that it may be applied to any of the fields discussed herein, as well as all others known to those skilled in the art.

Attempts have been made to recover the wasted energy from the processes discussed above, as well as others. As an example, U.S. Pat. No. 4,437,316 teaches method and apparatus for waste energy recovery through the use of a working fluid. This working fluid derives heat energy from the waste energy typically exhausted from a facility upon completion of a manufacturing process step. The energy of the working fluid is then utilized to develop steam at a temperature and pressure which make the steam extremely advantageous for use in the process. Waste energy from two different locations in the mechanical process apparatus is utilized to increase the energy of the working fluid through the use of separate independent evaporators. The working fluid passes from one evaporator to a first compressor and then to a cooling tank, for de-superheating the working fluid. The working fluid from the second evaporator passes directly to a second compressor. The working fluid from the output of the condenser passes to the cooling tank. The cooling tank de-superheats the working fluid entering the cooling device and automatically adjusts the level control between the liquid/vapor phases therein, enabling the first and second compressors, which operate under control of a common prime mover, to operate at significant different temperature and pressure levels and to accommodate different mass flow rates of the working fluid.

Although the aforementioned patent demonstrates that wasted energy from two independent process sources may be utilized in the process operation, a simplified multi-stream energy source steam generator which can accommodate a plurality of independent energy sources to power a simple steam generator using a common water volume for use in numerous applications would be welcome by the industry. Likewise, a simplified multi-stream energy source steam generator which does not require use of an intermediate working fluid is desirable. A direct steam generator with a lower overall system entropy is also needed. Finally, a multi-stream energy source steam generator which does not rely upon compressors would be welcome.

SUMMARY OF THE INVENTION

The present invention solves the problems associated with prior art devices (mentioned above) as well as others by providing a single steam-generating unit heated through a plurality of independent heated surfaces for steam generation, such as independent heat exchange tubes, all in contact with a common water source or fluid stream. The invention may have particular usefulness for providing steam to a fuel cell system and/or a fuel processor system which produces hydrogen rich gas for industrial purposes (including providing hydrogen rich gas to fuel cells).

The present invention provides a useful heat exchanger to recover energy from processes that have multiple points where energy is generated and needs to be removed or recovered, thereby improving the overall efficiency of the process and permitting an increased ability to do useful work. The system provides the generation of steam in a single volume of fluid (or a single fluid stream) and generally results in improved heat transfer.

As a result of the recirculation of the fluid in this invention, the steam never becomes high quality, which forces the heat transfer into transition and further causes film boiling heat transfer regimes on the boiling side. As a result, the materials and the overall weight of the steam generator is reduced by the present invention.

The probability for two-phase corrosion and erosion of the system surfaces is also reduced, and the overall system pressure drop will usually be less. Depending on the geometry chosen, the water inventory will be increased, which provides a buffering effect for transients and allows more time for controller action.

Since only a single multi-stream steam generator is needed according to this invention (rather than separate generators), the controls are simplified, but these controls still permit the energy of the individual heating streams to be removed.

Due to the characteristics of the fluids in each stream, it may be desirable to keep the heating fluids isolated because of their potential physical interaction. However, isolation of the heating fluids also has the added benefit of requiring two separate boundary failures before the heating fluids from two steam generating areas would be mixed. Ultimately, this isolated fluid set up results in a more reliable separation of the fluids than previously thought possible.

In summary, the present system requires less material, is easier to operate and control, is more efficient and reliable, and is safer for use in many processes where mixing may cause an accident.

Accordingly, the present invention comprises a steam generator having a plurality of energy sources for heating a common water inventory to generate steam. The generator consists of a steam generating vessel with a feed water inlet and a steam outlet and a plurality of heat exchangers located in the steam generating vessel with each individual heat exchanger being supplied with heat energy from different fluid sources.

Notably, the present invention does not raise the potential energy of the fluid stream by performing work on it. Instead, the essence of the present invention focuses on transferring energy already present within the system to conserve energy and/or perform additional work upon the system, thereby making the entire system more efficient.

DESCRIPTION OF THE PREFERRED EMBODIMENT

Figure 1:
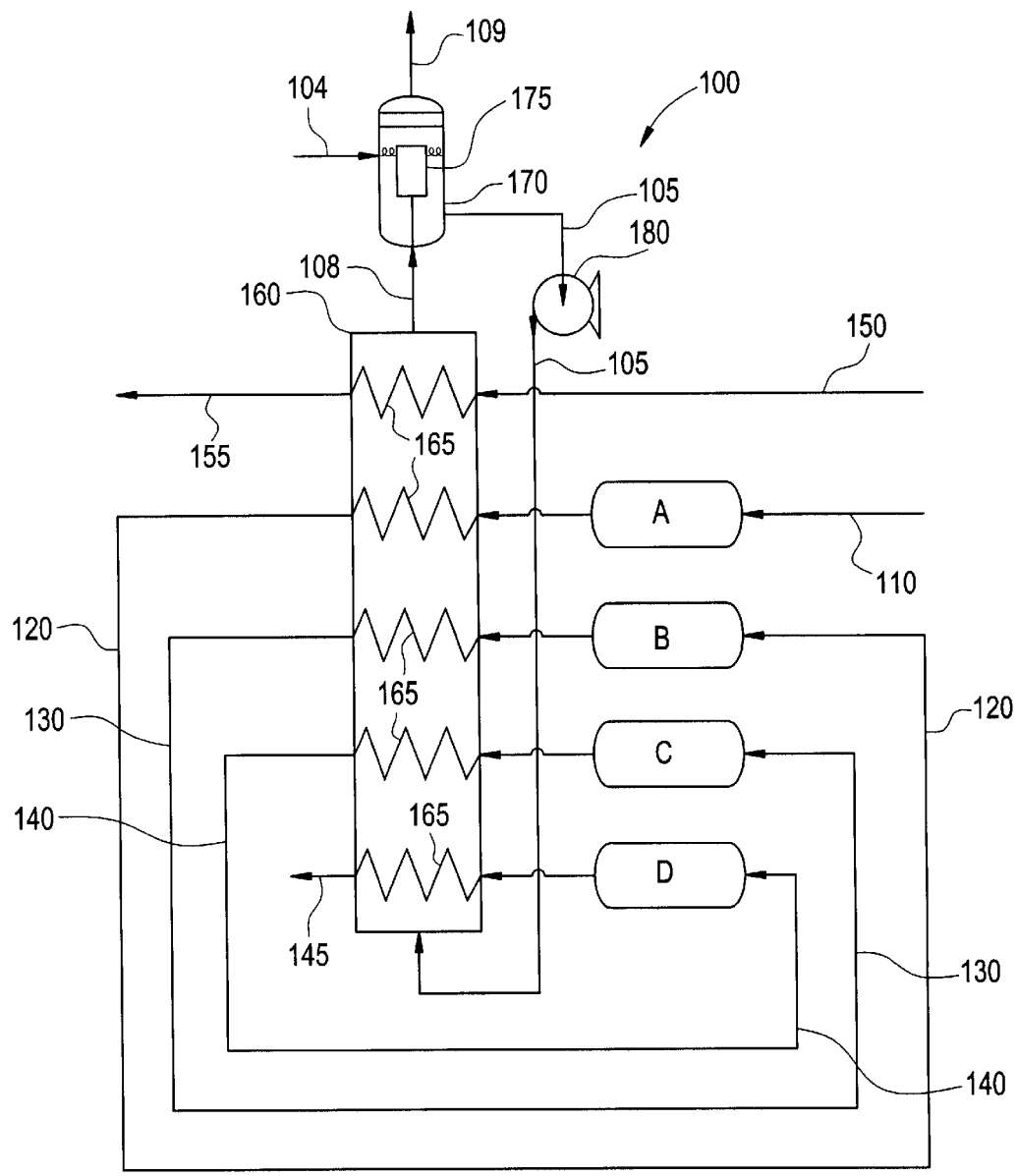
FIG. 1 is a schematic diagram of the present invention.

Referring now to the drawings, wherein like numerals represent similar elements, and with particular reference to FIG. 1, steam generator system 100 of the present invention is schematically depicted. Steam generator 100 uses a plurality of fluid streams 110, 120, 130, 140, 150 from a single system (preferably, a fuel processing system for production of hydrogen-rich gas) where the individual process streams 110, 120, 130, 140, 150 which are associated with distinct processes or operations within that system A, B, C, D. The individual processes 110, 120, 130, 140, 150 also may preferably contain different fluids and operate at different temperatures.

As seen in FIG. 1, the steam generator 100 controls the thermal conditions of processes B, C, D. By way of example and not limitation, these processes B, C, D could be the various purification processes required to reform and purify hydrocarbon fuels into hydrogen-rich gas (for example, desulfurization, selective oxidation, etc.) associated with primary process A (which could be a reforming process). These secondary processes could be linked in series to primary process A. Notably, process stream 110 is associated with process A, while stream 120 is linked with process B, stream 130 with process C, and stream 140 with process D. Stream 145, exiting the generator 100 (as pictured in FIG. 1), could also be supplied to a specific downstream process (not pictured).

In an alternative embodiment, processes A, B, C, D could be independent streams from separate manufacturing or production processes rather than all being connected in series (not shown in FIG. 1). As above, the streams exiting the generator 100 could be coupled to individual downstream processes. Any such independent streams would be individually incorporated into steam generator 100 through proper connections and manifolding. Stream 150, which is shown in FIG. 1, would be an example of a such a separate, independent stream. Stream 150 could be associated with some other process (not shown), or it could be a different stream following into or out from one or more of the processes A, B, C, D.

In a third embodiment, these two embodiments could be combined such that some streams are connected in series and some of the streams are independent. This particular combination of series and independent connections is pictured in the FIG. 1 schematic, with streams 110, 120, 130, 140 being connected in series, while stream 150 is independently incorporated. In each instance, after exiting the generator 100, streams 145 and 155 the generator 100 can be provided to other processes and/or can be disposed of in any appropriate fashion.

In any of these embodiments, again with reference to FIG. 1, the generator system 100 has a recirculating steam-water system comprising a vessel 170, a steam separator 175, and appropriate downcomers and risers (not specifically shown in this schematic) connected to the other elements of the generator system 100. Optionally, control system 180 may also be added to control the flow of water within the system (see below). Water may be supplied to the recirculating system as needed via feed water line 104.

Water stream 105 exits vessel 170 and enters heat exchanger device 160. Notably, water stream 105 may contain water or any other liquid capable of producing vaporous phases and/or steam. The heat transfer from the individual heat exchange elements 165 (located within device 160) to the water stream 105 helps to regulate the thermal conditions of the processes B, C, D by controlling the temperatures $T_1$, $T_2$, $T_3$ and $T_4$ of each respective stream 120, 130, 140, 145. Similarly, generator 100 also controls the temperature $T_5$ of independent stream 155, along with any other independent streams which may be incorporated into the system. To the extent that the operation of the generator may be selectively varied (and, more particularly, the heat exchange reactions occurring within heat exchanger 160), generator 100 has the ability to control the temperatures $T_1$, $T_2$, $T_3$, $T_4$ and/or $T_5$. For example, the flow into heat exchanger 160 may be selectively controlled through the use of control system 180 and/or via engineering of the design, physical structure and/or materials of the generator 100.

In turn, this selective control over temperatures $T_1$, $T_2$, $T_3$, $T_4$ and/or $T_5$ permits the overall steam generator system to also exert control over the downstream processes associated with each individual stream's temperature. To illustrate, $T_1$ is associated with stream 120 (as it exits heat exchange element 165) and immediately feeds into process B; consequently, to the extent the reactions of process B vary with temperature, control of process B is achieved by controlling $T_1$ (using control system 180, judicious design parameters and/or all other equivalents known to those skilled in the art). Similar control may be exercised over the other processes in the series and/or over any downstream process associated with an independent stream (i.e., any downstream process fed by stream 155). In sum, generator 100 is capable of selectively controlling the amount of steam it generates and/or the actual downstream processes B, C, D, etc. to which it is coupled.

While FIG. 1 shows heat exchange device 160 being located outside of the vessel 170, it is possible to partially or fully enclose device 160 within the vessel without deviating from the principles of this invention. Likewise, those skilled in the art will be able to readily adapt the exact design of the device 160 and/or any/all heat exchange elements 165 in order to achieve the goals contemplated by this invention.

Optimally, control system 180 may be a recirculation pump, a valve system or other device, although the need for any control system is dependent in part on the geometry of the system. For example, the embodiments illustrated in FIGS. 2 and 3 should have adequate natural circulation flow because of the natural head that develops between the dense liquid in the downcomer and the low density of the two phase mixture in the riser sections within the recirculating steam-water systems of those configurations.

As heat is transferred from each process stream to water stream 105, a steam stream 108 is generated. Steam stream 108 re-enters the recirculating steam-water system via steam separator 175, thereby returning any water to vessel 170 while at the same time creating steam 109. Bear in mind that, to the extent that flow of water stream 105 is controlled (either directly or through design and engineering), the amount of steam 109 generated by the generator 100 is also controlled. Additionally or alternatively, steam 109 generated may be diverted from the generator 100 to suit whatever is its intended use.

As will be appreciated by those skilled in the art, generator 100 must be properly manifolded to permit the flow patterns described herein. Further, while each process stream 110, 120, 130, 140, 150 may contain a slightly different fluid composition in comparison to the other process streams, differing fluids in each stream are not required to achieve the purposes of this invention. Likewise, additional compositions could be injected before or after each stream comes into contact with heat exchange elements 165.

Notably, the heat transfer reactions contemplated by this invention do not necessarily require all heat to flow from the process streams 110, 120, 130, 140, 150 to the water stream 105. It is equally possible to design a system where heat from the water stream 105 or the steam stream 108 is absorbed by one or more of the process streams. Those skilled in the art will be able to manipulate the thermal properties of the fluids to maximize their respective intended uses.

The schematic of FIG. 1 is intended only to depict the inventive concept. Nevertheless, it should be noted that the embodiment pictured therein should have particular utility with a fuel processing system associated with a fuel cell. Stream 150 would represent the exhaust flow from a fuel cell system, while process A is a reforming process and processes B, C, D are subsequent hydrogen or fuel purification processes (if needed, process A could instead represent a pre-reforming process such as desulfurization, while process B would be the actual reforming). Steam 109 could be provided to the reforming process A, the fuel cell (not shown) or for other purposes. Stream 110 would be a hydrocarbon-based fuel and stream 145 would be the final, hydrogen-rich gas product of the fuel processor system.

Figure 2:
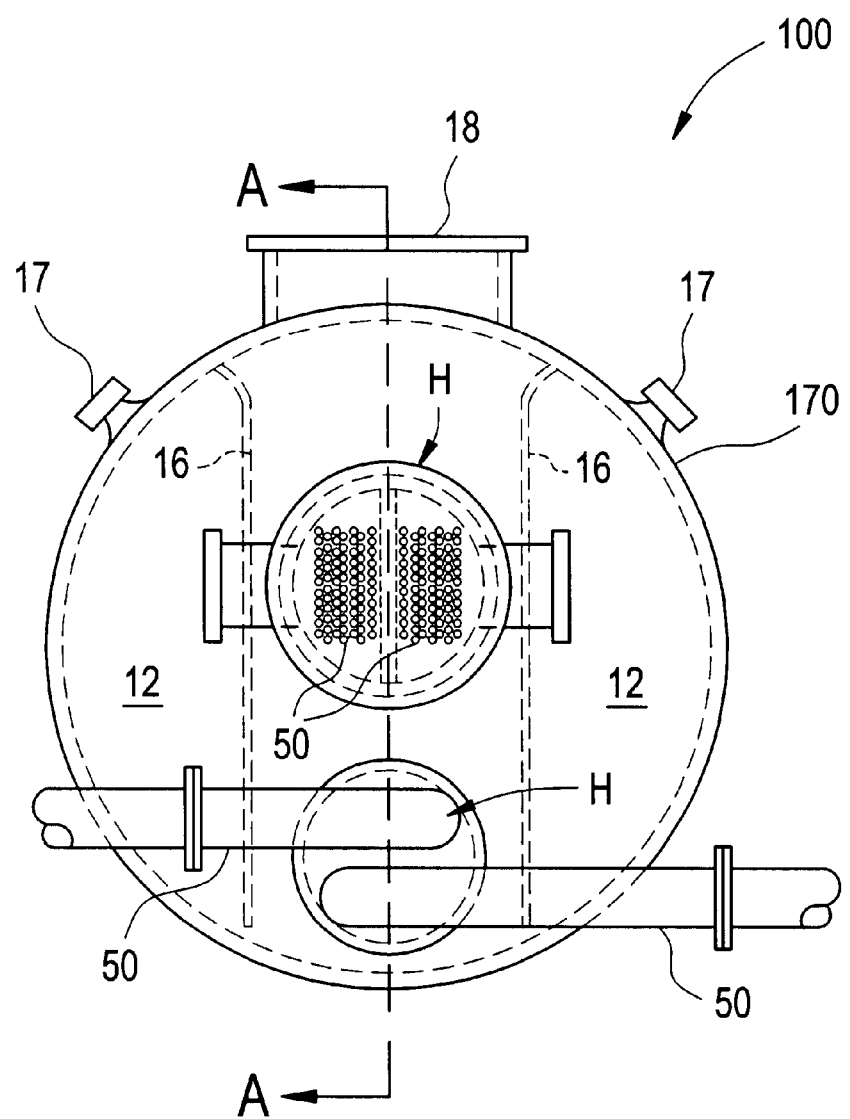
FIG. 2 is an end view of the steam generator of the present invention.

In FIG. 2, a specific embodiment of the steam generator 100 is shown having multiple heat energy sources, generally designated H, which are used to generate steam from a common supply of a working fluid 12. Working fluid 12 may be any fluid capable of generating steam or other useful and desired vapor phases, but for the indicated application it is most preferably water. Working fluid 12 is contained in vessel 170. The heat energy sources H are connected to sets of tube bundles or other heat transfer means 50, which are then inserted into steam generation vessel 170; notably, it will be understood that other heat transfer means may include straight tubes, plate-type heat exchange surfaces with a common boiling fluid stream, U-tubes, helically-shaped tubes, or other similar curved tube types. If plate heat exchangers are used, different sections of the same plate would be heated by the multiple heat sources in order to transfer the energy to the working fluid (which, in turn, would generate the steam). Heat transfer means 50 may be inserted from both ends of the vessel 170, and baffles 16 form an internal chimney up across the heat transfer means 50.

The steam generator 100 also uses a separator 175, not shown in FIG. 2, such as a steam drum assembly, to separate the steam from the water in the re-circulating fluid. This separator could be located within vessel 170 or on top of vessel exit 18 and, in the event a steam drum were employed, the separator 175 could have at least one curved arm primary separator. Generator 100 also has an external downcomer (not specifically shown in FIG. 2) to return the feed water and re-circulating water to vessel inlet 17 to pass up over the heat transfer means 50. The steam separator section and downcomer are not shown in FIG. 2 because these devices are well known—for example, external duct(s), internal recirculation path(s), and/or internal downcomer(s) could be used to provide a recirculation flow path.

Internal baffles 16 form a chimney to direct the boiling fluid up through the steam generating heat transfer means 50. The baffles 16 direct the newly formed steam and water mix toward exit 18. This two phase mixture then exits the generator 100 through outlet 18 and enters the separator 175.

If a one curved arm primary separator is used, the rotational flow permits steam to exit through a separator exit for use as needed, while the water from the separator 175 flows down the separator sides to be returned to inlet 17 by any known downcomer means. Notably, while the water provided to the inlet 17 may be re-circulated water from the separator 175 and/or newly introduced feed-water, the water entering the vessel should be introduced to the vessel 170 outside of the internal chimney area formed by baffles 16. The type of steam separator used may vary with the application and may range from natural separation to more complex multi-stage separators or an external super-heater.

Figure 3:
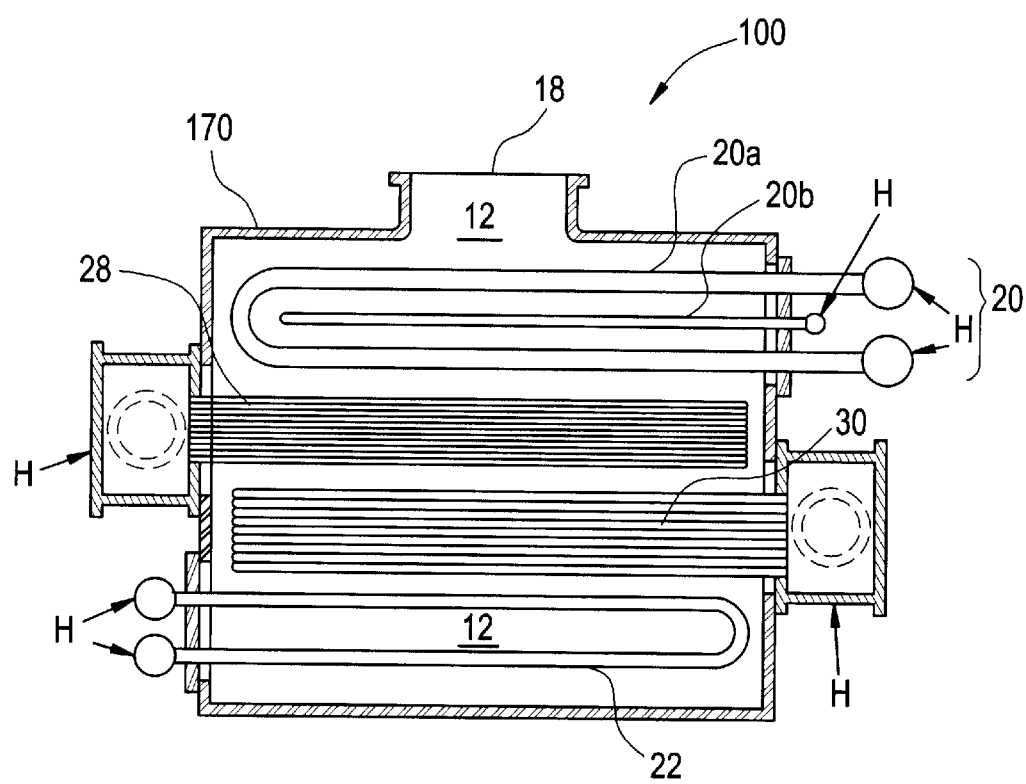
FIG. 3 is a cross-sectional side view of the FIG. 1 steam generator taken along section A—A.

As seen in FIG. 3, the shell 170 of the steam generator 100 is preferably designed to accept heat transfer means in the form of four separate tube bundles (as above, these bundles may be of any appropriate arrangement) in order to facilitate the fabrication and assembly of the generator. Two sets of tube bundles 20, 22 are inserted from opposite ends of the steam generator 100. One of the bundles, the top bundle 20, accommodates two independent heating flow streams. One set on U-tubes 20b are inside the U-bend of the other/outer set of larger U-tubes 20a. This judicious selection of tube bundle size and tube diameter/length permits use of two independent steam generating energy sources. However, those skilled in the art will readily adapt the size and diameter of any U-tubes both to optimize the heat exchange qualities of the system and to allow the respective U-tubes to be easily incorporated into the generator 100.

The remaining heat exchange means take the form of tubes bundle 22 and the vertical inlet bundles 28, 30. Each bundle 22, 28, 30 uses one flow stream as the energy source and thus contains only one size tube.

Using the foregoing arrangement described in FIG. 3, five independent heat sources may be used to generate steam from the generator 100. As can be seen, the surfaces of the generator can take on many forms depending on their flow rate and energy content. However, those skilled in the art will readily appreciate that any greater or lesser number of tube bundles and/or heat energy sources may be used.

Significantly, as mentioned above, the recycling of heat to produce steam may be used to the advantage of the entire system. For example, with reference again to FIG. 1, selective control of the flow rate and/or pressure of the water stream 105 flowing past heat transfer elements 165 in contact with process streams 110, 120, 130, 140, 150 will necessarily affect the temperatures ($T_1$, $T_2$, $T_3$, $T_4$ and $T_5$). Thus, if the overall functioning of the processes B, C, D and/or any downstream processes connected to streams 145, 155 flowing out of the generator 100 (not shown) are influenced or driven by heat energy, it is possible to control the overall performance of the system by varying the flow rate and/or pressure of the water/steam used in the present invention. Such control may be achieved by valves, pumps, bypasses, or any other known means.

Certain other additions and improvements will occur to those skilled in this art area upon a review of this disclosure. It will be understood that all such have been omitted herein for the sake of conciseness and readability, but are nevertheless properly within the scope of the following claims.

As an example, the steam generator may use multiple steam generators (with separators) and combine the steam flows, or go to a once-through-type steam generator where the steam or quality is increased as the liquid steam moves through one heat exchanger after another. Also, it may use an independent fluid to collect the energy into one steam source using five heat exchangers and then deliver this flow of steam to a steam generator heated by that one fluid.

We claim:

1. A steam generator system comprising:
   a vessel having a steam outlet, recirculation inlet, and a recirculation outlet;
   an amount of working fluid capable of forming steam;
   recirculation means for transporting the working fluid throughout the system, wherein the recirculation means is connected to the recirculation inlet and the recirculation outlet;
   separation means for separating the steam from the working fluid which is located proximate to the recirculation means;
   at least two processes having individual process fluids associated therewith, wherein each process fluid comes into contact with a heat exchange means for transferring heat energy between each process fluid and the working fluid in order to generate steam from the working fluid, wherein each process fluid is contained in a separate stream, wherein the process fluids are also separated from the working fluid, and wherein at least a portion of the heat exchange means are located inside of the vessel; and
   at least one baffle located inside the vessel wherein the baffle is positioned to direct the working fluid across the heat exchange means to facilitate the generation of steam.

2. A steam generator system as set forth in claim 1, wherein the heat exchange means comprises a U-tube.

3. A steam generator system as set forth in claim 2, wherein there are a plurality of U-tubes and wherein each U-tube has a diameter selected to optimize heat transfer between the process fluids and the working fluid.

4. A steam generator system as set forth in claim 1, further comprising control means for selectively controlling the working fluid which contacts the heat exchange means in order to maintain control over at least one of: the steam generated by the working fluid and at least one of the processes associated with one of the process fluids.

5. A steam generator system as set forth in claim 4, wherein the control means includes at least one of the following: pressure control means for controlling the pressure of the working fluid within the recirculation means, bypass means for diverting a portion of the working fluid away from the heat exchange means prior to the heat transfer, a pump, and a valve.

6. A steam generator system as set forth in claim 1, wherein the heat exchange means includes at least one of the following: a straight tube, a plate-type heat exchange surface having a common boiling fluid stream, a U-tube, a helical tube, or a curved tube.

7. A steam generator system comprising:
   a vessel having a steam outlet, recirculation inlet, and a recirculation outlet;
   an amount of working fluid capable of forming steam;
   recirculation means for transporting the working fluid throughout the system, wherein the recirculation means is connected to the recirculation inlet and the recirculation outlet;
   separation means for separating the steam from the working fluid which is located proximate to the recirculation means; and
   at least four processes having individual process fluids associated therewith, wherein each process fluid comes into contact with a heat exchange means for transferring heat energy between each process fluid and the working fluid in order to generate steam from the working fluid, wherein each process fluid is contained in a separate stream, wherein the process fluids are also separated from the working fluid and wherein the processes are part of a fuel processor system which produces hydrogen rich gas.

8. A steam generator system comprising:
   a vessel having a steam outlet, recirculation inlet, and a recirculation outlet;
   an amount of working fluid capable of forming steam;
   recirculation means for transporting the working fluid throughout the system, wherein the recirculation means is connected to the recirculation inlet and the recirculation outlet;
   separation means for separating the steam from the working fluid which is located proximate to the recirculation means;
   at least two processes having individual process fluids associated therewith, wherein each process fluid comes into contact with a heat exchange means for transferring heat energy between each process fluid and the working fluid in order to generate steam from the working fluid, wherein each process fluid is contained in a separate stream, and wherein the process fluids are also separated from the working fluid; and
   wherein the steam generated by the system is subsequently provided to at least one of: a fuel cell system and a fuel processor system which produces hydrogen rich gas.

9. A steam generator system as set forth in claim 8, wherein the separation means comprises a steam drum located outside of the vessel.

10. A steam generator system as set forth in claim 9, wherein the heat exchange means includes at least one of the following: a straight tube, a plate-type heat exchange surface having a common boiling fluid stream, a U-tube, a helical tube, or a curved tube.

11. A steam generator system as set forth in claim 8, wherein at least a portion of the heat exchange means are located inside of the vessel and further comprising at least one baffle located inside the vessel wherein the baffle is positioned to direct the working fluid across the heat exchange means to facilitate the generation of steam.

12. A steam generator system as set forth in claim 11, wherein at least one of the heat exchange means comprises a U-tube.

13. A steam generator system as set forth in claim 12, wherein there are a plurality of U-tubes and wherein each U-tube has a diameter selected to optimize heat transfer between the process fluids and the working fluid.

14. A steam generator system as set forth in claim 11, further comprising control means for selectively controlling the working fluid which contacts the heat exchange means in order to maintain control over at least one of: the steam generated by the working fluid and at least one of the processes associated with one of the process fluids.

15. A steam generator system as set forth in claim 14, wherein the control means includes at least one of the following: pressure control means for controlling the pressure of the working fluid within the recirculation means, bypass means for diverting a portion of the working fluid away from the heat exchange means prior to the heat transfer, a pump, and a valve.

16. A steam generator system as set forth in claim 11, wherein the heat exchange means includes at least one of the following: a straight tube, a plate-type heat exchange surface having a common boiling fluid stream, a U-tube, a helical tube, or a curved tube.

17. A steam generator system as set forth in claim 8, further comprising control means for selectively controlling the working fluid which contacts the heat exchange means in order to maintain control over at least one of: the steam generated by the working fluid and at least one of the processes associated with one of the process fluids.

18. A steam generator system as set forth in claim 17, wherein the heat exchange means includes at least one of the following: a straight tube, a plate-type heat exchange surface having a common boiling fluid stream, a U-tube, a helical tube, or a curved tube.

19. A steam generator system as set forth in claim 18, wherein the control means includes at least one of the following: pressure control means for controlling the pressure of the working fluid within the recirculation means, bypass means for diverting a portion of the working fluid away from the heat exchange means prior to the heat transfer, a pump, and a valve.

20. A steam generator system as set forth in claim 17, wherein the control means includes at least one of the following: pressure control means for controlling the pressure of the working fluid within the recirculation means, bypass means for diverting a portion of the working fluid away from the heat exchange means prior to the heat transfer, a pump, and a valve.

21. A steam generator system as set forth in claim 8, wherein the heat exchange means includes at least one of the following: a straight tube, a plate-type heat exchange surface having a common boiling fluid stream, a U-tube, a helical tube, or a curved tube.

22. A steam generator system as set forth in claim 8, wherein the amount of working fluid remains essentially constant and wherein the working fluid is naturally recirculated throughout the system.

23. A steam generator system as set forth in claim 8, wherein the working fluid consists essentially of water.

24. A steam generator system comprising:
a vessel having a steam outlet, a plurality of recirculation inlets, and a plurality of recirculation outlets;
an amount of a working fluid capable of forming steam;
recirculation means for transporting the working fluid, wherein the recirculation means includes separate streams connected to one of the recirculation inlets and one of the recirculation outlets;
at least one separation means for separating the steam from the working fluid which is located proximate to the recirculation means; and
at least four processes having individual process fluids associated therewith, wherein each process fluid comes into contact with a series of individual heat exchange means for transferring heat energy between each process fluid and the working fluid, wherein each individual heat exchange means which is connected to the recirculation means, wherein each process fluid is contained in a separate stream, wherein the process fluids are also separated from the working fluid, wherein steam is generated from the working fluid by each individual heat exchange means, and wherein the processes are part of a fuel processor system which produces hydrogen rich gas.

25. A steam generator system comprising:
a vessel having a steam outlet, a plurality of recirculation inlets, and a plurality of recirculation outlets;
an amount of a working fluid capable of forming steam;
recirculation means for transporting the working fluid, wherein the recirculation means includes separate streams connected to one of the recirculation inlets and one of the recirculation outlets;
at least one separation means for separating the steam from the working fluid which is located proximate to the recirculation means;
at least two processes having individual process fluids associated therewith, wherein each process fluid comes into contact with a series of individual heat exchange means for transferring heat energy between each process fluid and the working fluid, wherein each individual heat exchange means which is connected to the recirculation means, wherein each process fluid is contained in a separate stream, wherein the process fluids are also separated from the working fluid, and wherein steam is generated from the working fluid by each individual heat exchange means; and
wherein the steam generated by the system is subsequently provided to at least one of: a fuel cell system and a fuel processor system which produces hydrogen rich gas.

26. A steam generator system as set forth in claim 25, wherein the amount of working fluid remains essentially constant and wherein the working fluid is naturally recirculated throughout the system.

27. A steam generator system as set forth in claim 25, wherein the working fluid consists essentially of water.

28. A steam generator system as set forth in claim 25, wherein at least one of the individual heat exchange means includes at least one of the following: a straight tube, a plate-type heat exchange surface having a common boiling fluid stream, a U-tube, a helical tube, or a curved tube.

29. A steam generator system as set forth in claim 28, wherein there are a plurality of U-tubes and wherein each U-tube has a diameter selected to optimize the heat removal requirements of each heat exchanger.

30. A steam generator system as set forth in claim 25, further comprising control means for selectively controlling the working fluid which contacts at least one of the individual heat exchange means in order to maintain control over at least one of: the steam generated by the working fluid and at least one of the processes associated with one of the process fluids.

31. A steam generator system as set forth in claim 30, wherein the control means includes at least one of the following: pressure control means for controlling the pressure of the working fluid within the recirculation means, bypass means for diverting a portion of the working fluid away from at least one of the individual heat exchange means prior to the heat transfer, a pump, and a valve.

32. A steam generator system as set forth in claim 25, wherein the separation means comprises a steam drum located outside of the vessel.

33. A steam generator system comprising:

a vessel having a steam outlet, a plurality of recirculation inlets, and a plurality of recirculation outlets;

an amount of a working fluid capable of forming steam;

recirculation means for transporting the working fluid, wherein the recirculation means includes separate streams connected to one of the recirculation inlets and one of the recirculation outlets;

at least one separation means for separating the steam from the working fluid which is located proximate to the recirculation means;

at least two processes having individual process fluids associated therewith, wherein each process fluid comes into contact with a series of individual heat exchange means for transferring heat energy between each process fluid and the working fluid, wherein each individual heat exchange means which is connected to the recirculation means, wherein each process fluid is contained in a separate stream, wherein the process fluids are also separated from the working fluid, wherein steam is generated from the working fluid by each individual heat exchange means, and wherein at least a portion of at least one of the heat exchange means is located inside of the vessel; and at least one baffle also located inside the vessel wherein the baffle is positioned to direct the working fluid across the heat exchange means to facilitate the generation of steam.

* * * * *